Dec. 4, 1956 M. G. HANDSCHIN 2,773,123
METHOD AND DEVICE FOR DISTANT CONTROL OF A TELEPHONOGRAPH BY CODE SIGNALS OVER A TELEPHONE LINE
Filed Dec. 27, 1951
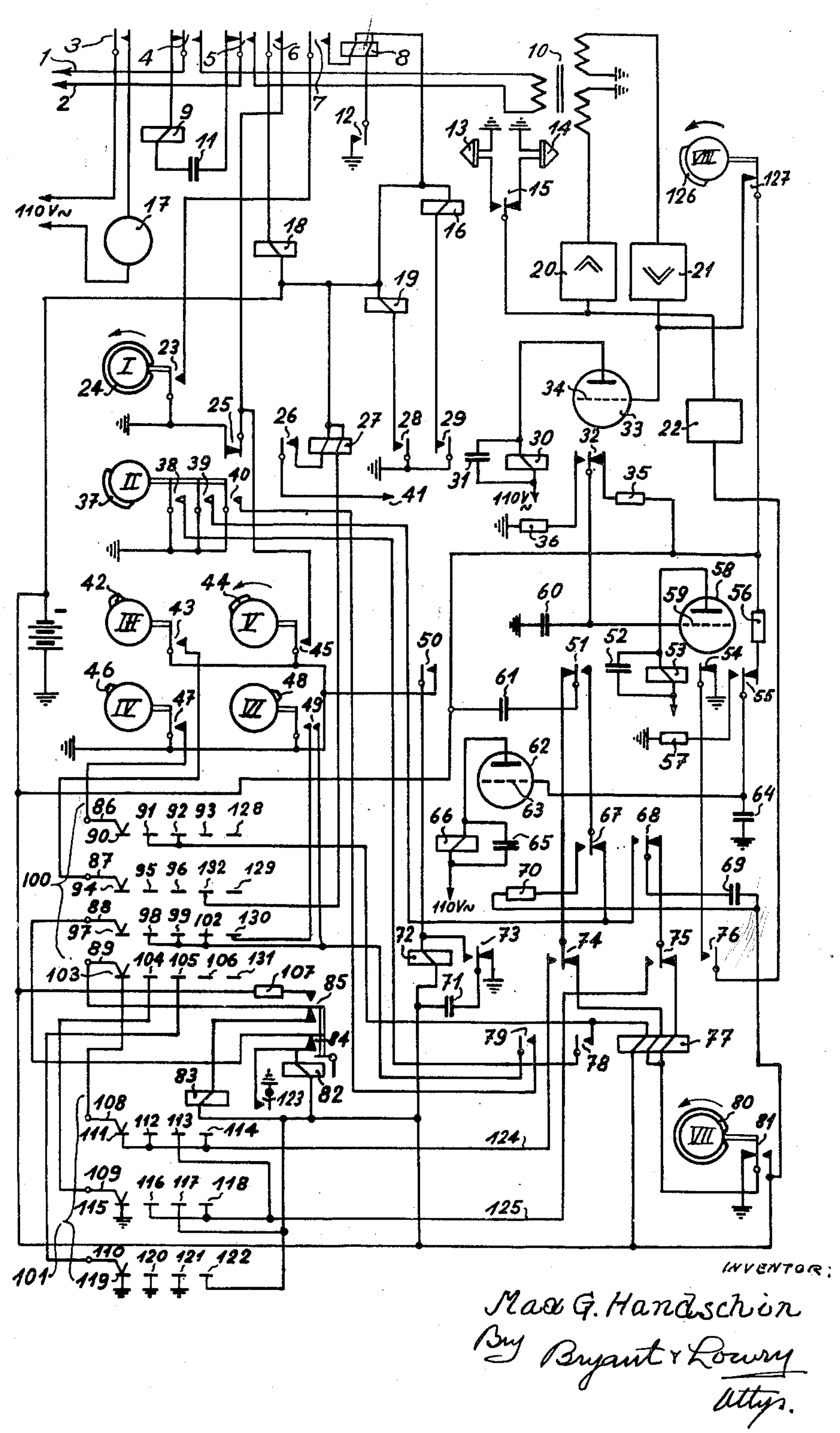
INVENTOR:
Max G. Handschin
By Bryant & Lowry
Attys.

United States Patent Office 2,773,123

Patented Dec. 4, 1956

2,773,123

METHOD AND DEVICE FOR DISTANT CONTROL OF A TELEPHONOGRAPH BY CODE SIGNALS OVER A TELEPHONE LINE

Max G. Handschin, Kusnacht, near Zurich, Switzerland, assignor to Promundo, Schaan, Liechtenstein, a firm Application December 27, 1951, Serial No. 263,548

10 Claims. (Cl. 179—6)

In the case of telephonographs which have already become known, distant actuation for the purpose of repeating an already recorded text can take place by transmitting single vowels in a sequence for which the coding device of the telephonograph is set. It is also known that a replying device provided in the telephonograph reproduces numbers or buzzing sounds and that the caller then has to transmit something between these transmissions, i. e. in the intervals, which may amount to about two seconds, for instance two speech impulses, which initiate the repetition if they correspond to the setting of the coding device.

As an undesirable actuation of the telephonograph must be avoided under all circumstances, this control by vowel signals requires a very generous provision of amplification, filters and automatic devices. It is also to be considered that certain vowels are not transmitted faultlessly by the telephone line, as the telephone network only admits frequencies from about 300 to 2000 Hz. In order to distinguish without error between the various vowels or formants, it is for instance necessary to provide at least two filters per vowel in the case of the vowels *e*, *i* and *o*. Also, the caller must pronounce these vowels very distinctly, which is quite difficult in certain languages, or if the caller has a cold.

On the other hand, in the case of distant control by two speech impulses between spoken numbers or between buzzing sounds, it was found to be inconvenient that the relay in the telephonograph which receives the speech impulses, responds to every sound, thus making distant control more difficult. With this type of distant control it is also somewhat troublesome to pronounce accurately the two speech impulses within the available short space of time.

In accordance with the present method for the coded distant control of a telephonograph over a telephone line all these disadvantages are avoided by initiating the telephonographic reproduction by at least one code signal of at least one syllable, conforming to the coding system for which the telephonograph is set.

The apparatus required to carry out the method in accordance with the present invention is characterised by the fact that the actuation of the coding device of the telephonograph takes place over a control unit which comprises three checking relays and one relay for the elimination of control errors.

The attached drawing shows the diagram of the connections of an apparatus which could be taken as an example of a device in accordance with the present invention. 1 and 2 indicate the line to the telephone exchange, which can be used by any subscriber to call the telephonograph shown here, whereupon the subscriber is connected to the telephonograph. The ringing current from the exchange will excite a relay 9 over the following circuit: exchange, line 1, contact 4, relay 9, condenser 11, contact 5, line 2, exchange. Relay 9 closes its contact 12 and excites relay 8 through earth, contact 12, first winding of relay 8, battery. Relay 8 closes or changes over its switches 3 to 7. Contact 3 puts motor 17 into circuit and, by changing over switch 4 and switch 5, line 1, 2 is connected to a repeating coil 10, which connects the telephonograph to the exchange. The electromagnetic coupling 18 of a replying device is excited over switch 6, it is in a circuit comprising earth, switch 25, switch 6, coupling magnet 18, battery. Motor 17 drives through a large reduction ratio eight cams (I to VIII) which commence to rotate in the directions indicated by arrows. At the same time motor 17 begins to drive a sound carrier (not shown) and the caller hears the replying device over sound head 14, the circuit being earth, sound head 14, switch 15, output amplifier 20, repeater coil 10, earth. Relay 8 remains closed, as its second winding is in circuit, owing to the position of the switches 7 and 23. An adjustable amplifier 21 is connected to the repeater coil 10, as well as the output amplifier 20. The output of adjustable amplifier 21 is connected to the control grid 34 of electronic valve 33. The latter is clocked during the operation of the replying device, because control grid 34 is connected through switch 127 of cam plate VIII to the negative terminal of the battery. As the valve is blocked, operation of the receiver of the distant control device is avoided. Otherwise the receiver would begin to operate, as the output of the replying device also affects the adjustable amplifier 21 over the repeater coil 10. As soon as cam plate II with cam 37 closes the switches 38, 39 and 40, and cam plate VIII with its cam 126 opens switch 127, the telephonograph is ready for reception.

In the distant-control receiver equipment three checking relays 30, 53 and 66 are provided. Of these relays 30 functions without any delay, but relay 53 has an operating delay of, say, 400 ms. and a release delay of, say, 150 ms. and relay 66 an operating delay of, say 500 ms. Measurements have shown that spoken words or numbers of one syllable have a duration of from 400 to 600 ms., words or numbers of two syllables a duration of from 900 to 1200 ms. The comparatively large difference in the duration of words (or numbers) of one and of two syllables is used for the purposes of the present device, and relays 53 and 66 are adjusted for these durations.

The coding device of the telephonograph is provided with a coding switch 101. Its three contactor arms 108—110 slide each over a contact with say 4 segments. In position 1 (shown) the contactor arms touch segments 111, 115, 119. In this position of the contactor arms a word of one syllable must be used to actuate the telephonograph. In position 2 the contactor arms touch the segments 112, 116 and 120 and the actuation of the telephonograph is correctly effected by pronouncing a word of one syllable and one of two syllables. In position 3 the contactor arms touch segments 113, 117 and 121 and a word of two syllables, followed by a word of one syllable, must be pronounced. In position 4 the contactor arms touch the segments 114, 118 and 122 and the call is effected by a word of one syllable, a word of two syllables, and a word of one syllable. It is of course possible to provide more contactor arms and segments, and consequently more word combinations.

Let us assume that the owner of the telephonograph has set the code switch 101 on position 4 before leaving. The telephonograph is now called by speech impulses corresponding to one word or number of one syllable, one of two syllables, and one of one syllable, e. g. "Rolf-Anna-Marie-Max" or, if numbers are used, e. g. "5–18–8." For a first example let us assume that the caller gives the speech impulses correctly. To facilitate the initiation of a reproduction for the caller, the duration of the second and third speech impulse will be indicated by a short buzzing sound. The buzzing sound will also be heard if an incorrect method of initiation is used, but not, if disturbing impulses (noise, clicks) get into the line, provided their duration is less than 400 ms. The present invention has over other known telephonographs the advantage that disturbing noises cannot make the reproduction control impossible.

If now the caller pronounces the number "5," relay 30 will be excited over adjustable amplifier 21 and an electronic valve 33, and changes over its change-over switch 32, which starts a slow discharge of a condenser 60 (in the grid circuit of electronic valve 58) over a resistance 36, so that the control grid 59 of electronic valve 58 becomes more positive. The proportions are such that relay 53 in the anode circuit of valve 58 responds with an operating delay of 400 ms. During this time a condenser 61 is charged through earth, contact 39 of cam plate II, switch 67, switch 51 of relay 53, and negative terminal of the battery. A relay 72 is excited through earth, switch 50 of relay 53, relay 72, and battery. The latter changes over its switch 73 and connects a condenser 71 in parellel with relay 72, so that the latter releases when switch 50 of relay 53 is opened, with a delay of, say, 100 ms. During this time the caller hears the buzzing sound mentioned above. If now the caller does not speak, relay 30 releases immediately and relay 53 releases with a little delay. The charged condenser 61 now excites a relay 83 through switch 51, switch 74, code switch 101, segment 114, contactor arm 108, seeker 100, segment 103, contactor arm 89, switch 85, relay 83, battery. Relay 83 closes its switch 123 and excites a seeker magnet 82, which now closes its contactor arms 86 to 89 for another step, so that the latter touch segments 91, 95, 98 and 104. The excitation of seeker magnet 82 causes switch 85 to change over so that relay 83 becomes again dead. At the same time the seeker magnet itself becomes dead through contact 84. To avoid another excitation of relay 83 by any residual current of condenser 61, this condenser is discharged during the excitation of the seeker magnet through a resistance 107. Now a buzzer 22 of the usual type is excited through earth, switch 54 of relay 53, switch 76 of relay 72, buzzer 22, output amplifier 20, repeater coil 10, earth. When the buzzing sound ceases, the caller says his second code word. As he is not bound to a definite interval, he has the advantage of being able to do this in a quite unconstrained manner. In our example he pronounces the number "18." Now, it is known that the telephone line does not transmit all consonnants without difficulty, consequently relay 30 will release momentarily while the caller is speaking. Since, however, consonnants are used together with vowels, the first syllable of the word of two syllables, which is now about to be pronounced, will last at least 400 ms., so that relay 53 will definitely respond. Relay 53 changes over its switch 55 and condenser 64 is discharged in about 400 to 500 ms. through resistance 57 so that the control grid 63 of an electronic valve 62 becomes positive and relay 66 in its anode circuit responds. A momentary interruption of relay 30 has no effect on relay 53 as condenser 60 is charged only slowly through resistance 35. As the code setting is such that a word of two syllables must pronounced, condenser 61, intended for words of one syllable, must be prevented from exciting relay 83. But now a condenser 69 is charged through earth, switch 39 of cam plate II, switch 68 of relay 66, condenser 69, battery, while condenser 61 is discharged through the circuit comprising battery, resistance 70, switch 67, switch 51, condenser 61, battery. If the caller has stopped speaking, i. e. if he has completed the pronunciation of the number "18," relay 30 immediately releases and relays 53 and 66 release with delay. This causes condenser 69 to discharge through switch 68, switch 75, coding switch 101, segment 104, seeker arm 89, switch 85, relay 83, battery, and relay 83 is excited. The seeker magnet is again excited and condenser 69 is completely discharged through resistance 107. The seeker arms 86 to 89 are advanced by one step. The caller again hears a short buzzing sound determined by the released relay 53 and the delayed-releasing relay 72. Now the caller can pronounce the last code word, i. e. in our example the number "8." As a word of only one syllable is pronounced, relays 30 and 53 are excited, condenser 61 is charged again, and relay 72 responds. When the code word is completed, relay 83 is excited through condenser 61, over switch 51, switch 74, coding switch 101, segment 122, contactor arm 110, seeker 100, segment 105, seeker arm 89, switch 85, relay 83, battery. Seeker magnet 82 is excited and condenser 61 is completely discharged through resistance 107. The caller again hears the buzzing sound. The cam plates I to VIII of the replying device have in the meantime continued to rotate in the direction of the arrows and the contactor arms 86 to 89 of the seeker 100 now touch the segments 93, 132, 102 and 106. As soon as a switch 43 of cam plate III is closed by cam 42, relay 27 responds through earth, switch 43, seeker arm 87, segment 132, first winding of relay 27, battery and actuates its switches 25, 26, 28 and 29. Through switch 29 a relay 16 is excited, which changes over its switch 15, so that the speaking head 14 of the replying device is disconnected, and the speaking head 13 is connected to the output amplifier 20. A coupling magnet 19 is excited through switch 28 and couples by a well-known method a sound carrier (not shown) to motor 17. The caller now hears the reproduction. The replying device continues to run, although switch 25 is opened, because coupling magnet 18 is excited through earth, switch 45, switch 6, coupling magnet 18, battery. As soon as switch 45 is opened by cam 44, the replying device stops. Relay 27 is kept by a well-known method above its switch 26 and another circuit 41 (not shown in detail). It is now not possible to excite relay 30, because the control grid 34 of valve 33 is connected through switch 127 of cam plate VIII to the negative terminal of the battery. When the reproduction is completed, relay 27 and coupling magnet 18 become dead and switch 15 again changes over to speaker head 14. On closing switch 25 of relay 27 the replying device will run back into its initial position, i. e. the caller will, as usual, hear further communications. Before arriving at the initial position, a switch 49 of cam plate VI will switch seeker 100 back into its initial position, this happens through the circuit earth, switch 49, segment 102, segment 130, seeker arm 88, switch 84, seeker magnet 82, battery. When the replying device has returned to its initial position, switch 23 will be opened so that the line 1, 2 is disconnected from the repeater 10 and all circuits become dead.

As a second example let us assume that the caller pronounces the numbers "5–8–18" instead of the correct code numbers. After the first, correct code number the contact arms 86 to 89 of the seeker 100 are on the segments 91, 95, 98 and 104. After the second, incorrect, code number "8" relay 53 is excited, as a monosyllabic word is pronounced. When now the caller says nothing else, relays 30 and 53 become dead. But now the charged condenser 61 cannot discharge through relay 83, as the corresponding circuit is now interrupted by the incorrect position of the contactor arms of coding switch 101 and of seeker 100. Nevertheless, the short buzzing sound is emitted. While relay 72 becomes dead, condenser 61, which is still charged, excites a control error relay 77 through switch 51, switch 54, second winding of relay 77, switch 81 of cam plate VII, battery. Now relay 77 remains excited through earth, switch 38 of cam plate VII, switch 78, grid winding of relay 77, battery. Of the three windings of relay 77 the first serves for control errors by dissyllabic words, the second for control errors by monosyllabic words, and the third as a holding armature and also for control errors by an incorrect number of code words. The excitation of relay 77 blocks through switch 79 of this relay the reproduction, by pushing contactor arms 86 to 89 of seeker 100 on to the segments 128 to 131. This happens through a circuit comprising earth, switch 40 of cam plate II, switch 79, segments 98, 99, 102, seeker arm 88, switch 84, seeker magnet 82, battery. Consequently, it is not possible to excite relay 27 in this case, and the caller hears no reproduction, because a circuit comprising switch 43 of cam plate III, seeker arm 87 and segment 132 is not connected up. The disconnection occurs in a manner which was already described, i. e. first relay 77 becomes dead on opening switch 40.

Another case of wrong control occurs when the caller speaks an insufficient number of code words into the apparatus. Let us assume that he pronounces only the first monosyllabic code word "5." All circuits are then alive as in the first example. If, however, further words or numbers are not forthcoming, the third armature of relay 77 is excited through earth, switch 47 of cam plate IV, switch 86, seeker 100, segment 91, third winding of relay 77, battery. The contactor arms 86 to 89 of seeker 100 will again touch the segments 128 to 131 so that a circuit of relay 27 cannot be brought about, and no reproduction takes place.

For a further example let us assume that the caller after the correct pronunciation of the three numbers speaks another, dissyllabic number. The circuits again become alive as in the first example. The contactor arms 86 to 89 then stand on the segments 93, 132, 102 and 106, that is in the position for correct actuation. But switch 43 of cam plate III is not yet closed, because this cam plate has not yet rotated far enough. If now the caller speaks, for instance, a further dissyllabic number, condenser 69 is charged, as already described. After the speech impulse the relays 30, 53 and 66 become dead. But condenser 69 can discharge through relay 83 only if the relay 72, which is of the delayed-release type, has released. Then condenser 69 discharges through switch 68, switch 75, first armature of relay 77, switch 81 of cam plate VII, battery. The relay 77 is again held, as above, and seeker 100 again runs into the position for false control, so that in this case, as before, a reproduction is impossible.

There remains to be mentioned that switch 81 is provided to charge condensers 61 and 69 at rest through relay 77, as these two condensers are of the electrolytic type and would be in danger without this provision.

The difference in the duration of the mono- and dissyllabic words is so large that there is no danger of wrong connections if these code words are pronounced normally. A further advantage consists in this that disturbing noises in the surroundings of the caller, as e. g. closing of doors, coughing, etc. have no effect, because they cannot excite relays 53 and 66. The excitation of relay 30 by disturbing noises is also without any influence on the time available for the transmission of the speech impulses, because switch 32 of this relay after each disturbing impulse immediately returns to its position of rest and condenser 60 is always charged again over resistance 35, so that electronic valve 58 is blocked and the operating delay of relay 53 is neutralised.

While the invention has been described in detail with respect to a now preferred example and embodiment of the invention it will be understood by those skilled in the art after understanding the invention, that various changes and modifications may be made without departing from the spirit and scope of the invention and it is intended, therefore, to cover all such changes and modifications in the appended claims.

Having thus described my invention, I claim as new and desire to secure by Letters Patent:

1. A telephonograph apparatus including means for recording and reproducing a message over a telephone line, a series of electronic valves each having at least an anode, a cathode and a control grid, means for normally biassing said control grids negatively, circuit means including an amplifier of incoming sound signals for controlling the energization of the first valve of the series in accordance with the duration of an incoming signal sound on said line, a condenser between the grid of each valve and earth, a battery having its positive terminal connected to earth and its other terminal connected through a resistance to said condensers, and a checking relay in the anode circuit of each valve, said relays being connected in a sequence to control said reproducing means in response to the reception of a predetermined sequence of sounds each having a predetermined syllabic content.

2. A telephonograph in accordance with claim 1, and means for adjusting the operating delays of said relays.

3. A telephonograph in accordance with claim 2, in which said adjusting means comprises a timing resistor-condenser combination connected to each of said valves.

4. A telephonograph in accordance with claim 3, in which at least one of said relays is connected to control the connection of an additional condenser in parallel with the timing condenser of one of said valves.

5. A telephonograph apparatus including means for reproducing a recorded message over a connected telephone line in response to a coded succession of separate sounds on said telephone line each of a predetermined relative syllabic content corresponding substantially to a predetermined time interval, comprising a series of sound-actuated relays each responsive only to a signal sound of a predetermined duration on said telephone line to successively energize another similar relay responsive to a sound of predetermined duration which may be different from said first duration, and switching means for controlling the successive operation of said relays according to a predetermined code, and means controlled by the last operating relay of the series to initiate reproduction of said message over said telephone line.

6. The invention according to claim 5, said switching means being arranged to provide selectively different successions of operation of the relays according to desired signal codings.

7. The invention according to claim 6, each said relay comprising an electronic valve having a control grid, and R–C impedance means interposed in the circuit of said control grid to establish a predetermined operating delay for each relay in accordance with the time constant of its R–C means.

8. The invention according to claim 7, and means responsive to reception of signal sounds of successively different duration from those corresponding to the successive time delays of said relays for inhibiting initiation of operation of said reproducing means.

9. The invention according to claim 8, one of said relays being set to a time delay corresponding to the time of utterance of a single syllable, and another of said relays being set to a time delay corresponding to the time of utterance of a predetermined greater number of syllables.

10. The invention according to claim 9, and means for transmitting out a signal on said telephone line to indicate the operation of each relay to signal a condition of readiness for reception of a successive incoming signal sound.

References Cited in the file of this patent

UNITED STATES PATENTS

| | | |
|---|---|---|
| 2,171,366 | Hipple | Aug. 29, 1939 |
| 2,519,568 | Handschin | Aug. 22, 1950 |
| 2,537,407 | Handschin et al. | Jan. 9, 1951 |
| 2,575,909 | Davis et al. | Nov. 20, 1951 |